United States Patent
Jiang

(10) Patent No.: US 10,798,340 B2
(45) Date of Patent: Oct. 6, 2020

(54) AUXILIARY STREAM TRANSMISSION METHOD BASED ON VIDEO CONFERENCE SYSTEM

(71) Applicant: YEALINK (XIAMEN) NETWORK TECHNOLOGY CO., LTD., Xiamen (CN)

(72) Inventor: Hu Jiang, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/691,287

(22) Filed: Nov. 21, 2019

(65) Prior Publication Data

US 2020/0169696 A1    May 28, 2020

(30) Foreign Application Priority Data

Nov. 23, 2018   (CN) .......................... 2018 1 1407747

(51) Int. Cl.
*H04N 7/15*       (2006.01)
*H04L 12/18*      (2006.01)
*H04N 21/4363*    (2011.01)

(52) U.S. Cl.
CPC .......... *H04N 7/152* (2013.01); *H04L 12/1822* (2013.01); *H04L 12/1827* (2013.01); *H04N 21/43635* (2013.01)

(58) Field of Classification Search
CPC .............. H04N 7/152; H04N 21/43635; H04L 12/1822; H04L 12/1827
See application file for complete search history.

(56) References Cited

U.S. PATENT DOCUMENTS

| | | | |
|---|---|---|---|
| 2013/0067121 A1* | 3/2013 | Beel .................... | H04L 12/1813 710/20 |
| 2018/0124354 A1* | 5/2018 | Aarrestad ............. | H04R 1/403 |
| 2018/0219924 A1* | 8/2018 | Nagabushanam .... | H04L 65/403 |

* cited by examiner

*Primary Examiner* — Stella L. Woo

(57) ABSTRACT

The present invention relates to an auxiliary stream transmission method based on a video conference system. The method integrates an auxiliary stream function into an auxiliary stream peripheral, a computer is connected to a master server of the video conference system through the auxiliary stream peripheral, and the master server and the auxiliary stream peripheral are connected through a network cable. In the present invention, the auxiliary stream peripheral and the master server are connected through a network cable, to improve flexibility of system deployment, and costs of the network cable are low, to correspondingly reduce deployment costs of the system.

2 Claims, 1 Drawing Sheet

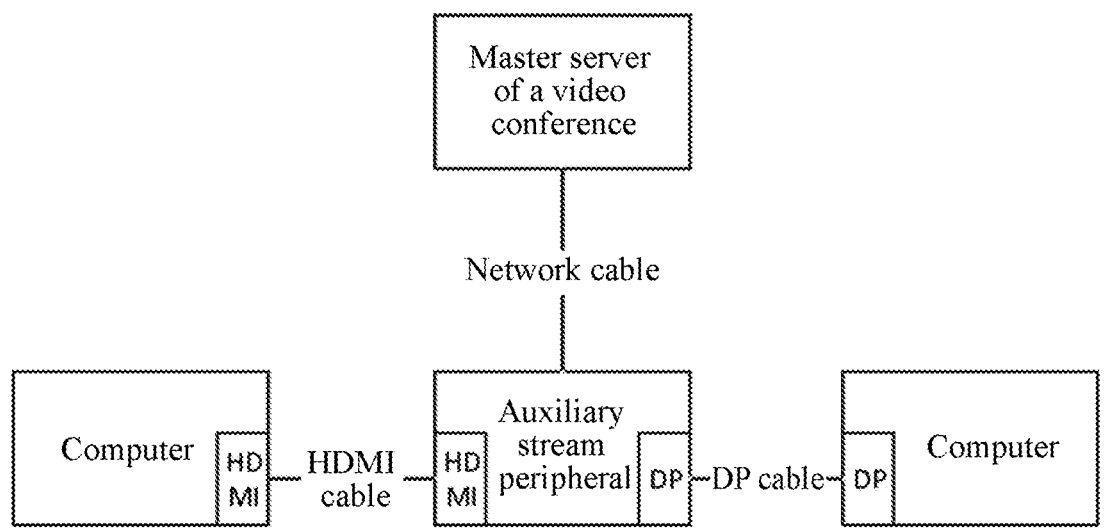

AUXILIARY STREAM TRANSMISSION METHOD BASED ON VIDEO CONFERENCE SYSTEM

CROSS-REFERENCE TO RELATED APPLICATIONS

The present application is a U.S. non-provisional claiming priority under 35 U.S.C. § 119 to Chinese Patent Application No. 201811407747.3, filed on Nov. 23, 2018.

BACKGROUND

Technical Field

The present invention relates to the field of video conference systems, and specifically, to an auxiliary stream transmission method based on a video conference system.

Related Art

A video conference system implements a virtual conference by using a network communications technology, gathers geographically dispersed users at a place, and exchanges information in various manners such as images and sounds, to implement cooperative work. A video conference shortens a space distance to the greatest extent, thereby facilitating real-time and visual communication between cooperative members.

Generally, the video conference system includes a master server and a plurality of slave servers, the master server and the slave servers not only support the most basic video conference function, but also support transmission of auxiliary stream data such as a presentation document in a computer and audio/video data in a storage device. The transmission of auxiliary stream data is implemented by using the following method: an auxiliary stream input function is integrated into the master server of the video conference system, and then the computer is accessed to the master server through a professional audio/video cable, so that the auxiliary stream data in the computer can be output to the master server.

This auxiliary stream transmission manner is very convenient in a usage scenario of a small conference room. However, in a usage scenario of a large conference room, the auxiliary stream transmission manner has a deployment problem. On one hand, costs of the professional audio/video cable are high, and a requirement of a large conference room cannot be met. On the other hand, an excessively long audio/video cable has a signal loss. Consequently, display is abnormal or even display cannot be performed. That is, in the usage scenario of a large conference room, the current auxiliary stream transmission manner increases the deployment costs and reduces the deployment flexibility.

In addition, the usage scenario of a large conference room is relatively complex. Sometimes, a plurality of input auxiliary streams is required, that is, a plurality of computers needs to be connected to the master server. Consequently, there are excessive interfaces on the master server, affecting the aesthetic feeling of the appearance of the master server and the strength of structural members.

SUMMARY

In view of the foregoing problem, an objective of the present invention is to provide an auxiliary stream transmission method based on a video conference system, which can improve the flexibility of system deployment and reduce the deployment costs.

To achieve the foregoing objective, the technical solution used in the present invention is as follows:

an auxiliary stream transmission method based on a video conference system, where the method integrates an auxiliary stream function into an auxiliary stream peripheral, a computer is connected to a master server of the video conference system through the auxiliary stream peripheral, and the master server and the auxiliary stream peripheral are connected through a network cable;

when the auxiliary stream peripheral is accessed to the master server of the video conference system through a network cable and the computer is accessed to the auxiliary stream peripheral, the auxiliary stream peripheral reports auxiliary stream information in the computer to an encoding/decoding unit of the auxiliary stream peripheral, and the encoding/decoding unit decodes, encodes, and compresses video and audio signals according to the auxiliary stream information, and sends the video and audio signals to the master server through Ethernet; and the master server receives the auxiliary stream information and code streams of the auxiliary stream peripheral, and performs decompression, decoding, and encoding, and then an auxiliary stream is displayed on the master server.

An HDMI interface and a DP interface are disposed on the auxiliary stream peripheral, and the auxiliary stream peripheral is connected to the computer through an HDMI cable or a DP cable.

The auxiliary stream peripheral uses a standard Ethernet protocol.

After using the foregoing solution, the present invention integrates the auxiliary stream function into the auxiliary stream peripheral, auxiliary stream data in the computer is output to the master server of the video conference system through the auxiliary stream peripheral, where the auxiliary stream peripheral and the master server are connected through a network cable, to improve flexibility of system deployment, and costs of the network cable are low, to correspondingly reduce deployment costs of the system. In addition, because the master server and the auxiliary stream peripheral are connected through a network cable, the master server can be connected to a plurality of auxiliary stream peripherals by using a switch, to connect to a plurality of computers and support input of a plurality of auxiliary streams, to not only improve the usage flexibility of the video conference system in the usage application of a large conference room, but also avoid the impact on the appearance and the structural strength of the master server caused by adding a plurality of interfaces on the master server.

BRIEF DESCRIPTION OF THE DRAWINGS

FIG. 1 is a schematic diagram of an auxiliary stream transmission connection according to the present invention.

DETAILED DESCRIPTION

As shown in FIG. 1, the present invention discloses an auxiliary stream transmission method based on a video conference system. The method integrates an auxiliary stream function into an auxiliary stream peripheral, an HDMI interface and a DP interface are disposed on the auxiliary stream peripheral, and the auxiliary stream peripheral is connected to a computer through an HDMI cable or a DP cable; the auxiliary stream peripheral uses a standard Ethernet protocol, and is connected to the master server of the video conference system through a network cable.

When the auxiliary stream peripheral is accessed to the master server of the video conference system through a network cable, the master server discovers the access of the auxiliary stream peripheral by using a discovery protocol; when the computer is accessed to the auxiliary stream peripheral through the HDMI cable or DP cable, the auxiliary stream peripheral reports, according to the discovery protocol, auxiliary stream information, such as resolution, frames rate, scanning mode, sampling frequency, and sampling size, in the computer to an encoding/decoding unit of the auxiliary stream peripheral, and the encoding/decoding unit decodes, encodes, and compresses video and audio signals according to the auxiliary stream information, and sends the video and audio signals to the master server through Ethernet. The master server receives the auxiliary stream information and code streams of the auxiliary stream peripheral, and performs decompression, decoding, and encoding, and then an auxiliary stream is displayed on the master server.

The key of the present invention lies in that, the present invention integrates the auxiliary stream function into the auxiliary stream peripheral, auxiliary stream data in the computer is output to the master server of the video conference system through the auxiliary stream peripheral, where the auxiliary stream peripheral and the master server are connected through a network cable, to improve flexibility of system deployment, and costs of the network cable are low, to correspondingly reduce deployment costs of the system. In addition, because the master server and the auxiliary stream peripheral are connected through a network cable, the master server can be connected to a plurality of auxiliary stream peripherals by using a switch, to connect to a plurality of computers and support input of a plurality of auxiliary streams, to not only improve the usage flexibility of the video conference system in the usage application of a large conference room, but also avoid the impact on the appearance and the structural strength of the master server caused by adding a plurality of interfaces on the master server.

Furthermore, the auxiliary stream peripheral uses a standard Ethernet protocol, so that the universality of the auxiliary stream peripheral can be improved, to implement plug and play on various video devices; an HDMI interface and a DP interface are integrated on the auxiliary stream peripheral, so that the auxiliary stream peripheral can support a computer with an HDMI interface or a DP interface, thereby improving the adaptability of the auxiliary stream peripheral.

The above descriptions are merely embodiments of the present invention, and are not intended to limit the technical scope of the present invention in any manner, and any minor amendment, equivalent change, and modification made to the foregoing embodiments according to the technical essence of the present invention shall still fall within the scope of the technical solution of the present invention.

What is claimed is:

1. An auxiliary stream transmission method based on a video conference system, wherein: the method integrates an auxiliary stream function into an auxiliary stream peripheral, a computer is connected to a master server of the video conference system through the auxiliary stream peripheral, and the master server and the auxiliary stream peripheral are connected through a network cable;

when the auxiliary stream peripheral is accessed to the master server of the video conference system through a network cable and the computer is accessed to the auxiliary stream peripheral, the auxiliary stream peripheral reports auxiliary stream information in the computer to an encoding/decoding unit of the auxiliary stream peripheral, and the encoding/decoding unit decodes, encodes, and compresses video and audio signals according to the auxiliary stream information, and sends the video and audio signals to the master server through Ethernet; and the master server receives the auxiliary stream information and code streams of the auxiliary stream peripheral, and performs decompression, decoding, and encoding, and then an auxiliary stream is displayed on the master server, wherein an HDMI interface and a DP interface are disposed on the auxiliary stream peripheral, and the auxiliary stream peripheral is connected to the computer through an HDMI cable or a DP cable.

2. The auxiliary stream transmission method based on a video conference system according to claim 1, wherein the auxiliary stream peripheral uses a standard Ethernet protocol.

* * * * *